United States Patent
Wiley et al.

(10) Patent No.: US 6,766,715 B1
(45) Date of Patent: Jul. 27, 2004

(54) CONTROL MECHANISM FOR HYDRAULIC DEVICES

(75) Inventors: Thomas D. Wiley, Lovington, IL (US); Herb Poplawski, Racine, WI (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 17 days.

(21) Appl. No.: 10/304,281

(22) Filed: Nov. 26, 2002

(51) Int. Cl.$^7$ .......................... B60K 20/00; F16D 39/00
(52) U.S. Cl. ...................... 74/606 R; 74/473.1; 60/487
(58) Field of Search .......................... 701/93; 74/606 R, 74/471 R, 473.1, 473.13, 473.19, 473.2, 473.21; 180/364, 368

(56) References Cited

U.S. PATENT DOCUMENTS

| | | | |
|---|---|---|---|
| 3,354,981 A | | 11/1967 | Swanson et al. |
| 3,488,955 A | * | 1/1970 | Buelow ...................... 60/492 |
| 3,837,235 A | | 9/1974 | Peterson |
| 4,018,104 A | | 4/1977 | Bland et al. |
| 4,111,062 A | | 9/1978 | Calligan |
| 4,167,855 A | | 9/1979 | Knapp |
| 4,352,302 A | | 10/1982 | McAlliffe et al. |
| 4,375,771 A | | 3/1983 | Kobelt |
| 4,438,660 A | | 3/1984 | Kittle |
| 4,845,949 A | | 7/1989 | Shivvers et al. |
| 4,932,209 A | | 6/1990 | Okada et al. |
| 4,934,252 A | | 6/1990 | Giere |
| 4,955,249 A | | 9/1990 | Wetor |
| 4,958,535 A | * | 9/1990 | Swartzendruber ............ 74/481 |
| 5,022,477 A | * | 6/1991 | Wanie ...................... 180/6.34 |
| 5,042,252 A | | 8/1991 | Havens et al. |
| 5,044,478 A | | 9/1991 | Kaesgen et al. |
| 5,094,077 A | | 3/1992 | Okada |
| 5,182,966 A | | 2/1993 | von Kaler et al. |
| 5,228,360 A | * | 7/1993 | Johnson ...................... 74/512 |
| 5,289,738 A | | 3/1994 | Szulczewski |
| 5,311,740 A | | 5/1994 | Shiba et al. |
| 5,314,387 A | | 5/1994 | Hauser et al. |
| 5,333,451 A | | 8/1994 | Sakikawa et al. |
| 5,339,631 A | | 8/1994 | Ohashi |
| 5,375,674 A | * | 12/1994 | Peter .......................... 180/19.3 |
| 5,440,951 A | | 8/1995 | Okada et al. |
| 5,546,752 A | | 8/1996 | Horton et al. |
| 5,555,727 A | | 9/1996 | Hauser et al. |
| 5,771,758 A | | 6/1998 | Hauser |
| 5,794,443 A | | 8/1998 | Shimizu |
| 5,819,537 A | | 10/1998 | Okada et al. |
| 5,836,159 A | | 11/1998 | Shimizu et al. |
| 5,873,287 A | | 2/1999 | Kawada |
| 5,887,484 A | | 3/1999 | Abend et al. |
| 6,122,996 A | | 9/2000 | Hauser et al. |
| 6,152,247 A | | 11/2000 | Sporrer et al. |
| 6,199,380 B1 | | 3/2001 | Ishii |
| 6,216,560 B1 | | 4/2001 | Takada et al. |
| 6,233,929 B1 | | 5/2001 | Okada et al. |
| 6,250,414 B1 | * | 6/2001 | Sato et al. ................... 180/307 |
| 6,272,854 B1 | | 8/2001 | Ishii et al. |
| 6,279,937 B1 | * | 8/2001 | Hunt .......................... 180/336 |

OTHER PUBLICATIONS

Eaton, Hydrostatic Transaxles, Catalog 11–888, Aug. 1991.

* cited by examiner

*Primary Examiner*—Tisha D Lewis
(74) *Attorney, Agent, or Firm*—Neal, Gerber & Eisenberg, LLP (57) ABSTRACT

A control apparatus for use with a hydraulic device such as a pump or hydrostatic transmission having a swash plate which may be moved between forward, reverse and neutral positions by a rotatable shaft. The apparatus provides cruise control in only one of the forward or reverse directions and a return to neutral force in the other direction. A control arm is engaged to the shaft to move the swash plate between the forward, revere and neutral positions. A cruise control arm is also mounted on and rotatable about the shaft, and a linkage connects the control arm to the cruise control arm, which only moves between the neutral and forward positions. A spring device is compressed when the control arm is moved from the neutral position to a reverse position to force the control am to return the shaft to the neutral position.

18 Claims, 7 Drawing Sheets

CONTROL MECHANISM FOR HYDRAULIC DEVICES

BACKGROUND OF THE INVENTION

This invention relates generally to hydraulic devices such as an axle driving apparatus and, more particularly, to a control mechanism adapted to be mounted to the casing of a transaxle. The control mechanism disclosed herein could also be used with hydraulic pumps, hydrostatic transmissions, or other types of hydrostatic transaxles.

Hydrostatic transmissions ("HSTs") are known in the art. Generally, an HST includes a center section on which is mounted a rotating hydraulic pump and a rotating hydraulic motor. The hydraulic pump and the hydraulic motor each carry a plurality of reciprocating pistons which are in fluid communication through hydraulic porting formed in the center section. Rotation of the hydraulic pump against a moveable swash plate creates an axial motion of the pump pistons that forces an operating oil through the hydraulic porting to the hydraulic motor to move the motor pistons. The axial motion of the motor pistons causes the hydraulic motor to rotate as the motor pistons bear against a thrust bearing. The hydraulic motor output may be used to drive the vehicle axles of a riding lawn mower, small tractor and the like. It is also known to use a hydraulic pump in its own housing, where the connection to a hydraulic motor is made through hoses or other connectors. An integrated hydrostatic transaxle ("IHT") incorporates the elements of an HST in the same housing with output gearing, axles and the like.

In these applications, the position of the swash plate with respect to the hydraulic pump pistons is changed to adjust the speed and direction of rotation of the hydraulic motor and, accordingly, the output thereof. The orientation with which the swash plate addresses the hydraulic pump pistons can be changed to control whether the hydraulic motor rotates in the forward direction or in the reverse direction, and the speed at which the hydraulic motor rotates. There is also a neutral position in which the pump will displace insufficient hydraulic fluid to cause motor rotation.

It is known to use a trunnion arm coupled to the swash plate in order to change the swash plate orientation. A speed change lever or pedal is, in turn, coupled to the trunnion arm through a wire or other driving link. In this manner, movement of the speed change lever/pedal results in movement of the trunnion arm to change the position of the swash plate to thereby control the speed and direction of the vehicle. Examples of such mechanisms for adjusting the speed of a vehicle may be seen in U.S. Pat. No. 6,253,637, which is incorporated herein by reference in its entirety.

SUMMARY OF THE INVENTION

The present invention discloses an improved control mechanism comprising a return to neutral ("RTN") mechanism and a cruise control mechanism that is adapted to be mounted to the casing of a hydraulic pump or hydrostatic transaxle. For simplicity of explanation the invention will be described in association with an integrated hydrostatic transaxle ("IHT").

A rotatable trunnion arm is coupled to the moveable awash plate and extends from the casing to engage the control mechanism. A return to neutral mechanism acts to force the trunnion arm from the stroked position back to the neutral position. It will be understood that the position referred to herein as "neutral" need not be a perfect neutral; in some applications there may still be some hydraulic flow when the unit is in the chosen "neutral" position The amount of such flow permitted in this neutral position will depend upon the application and the design parameters.

The return to neutral feature is preferably unidirectional, in that it provides a return force when the unit is stroked in one direction, either reverse or forward, but does not provide any return force when the unit is stroked in the opposite direction. By way of example, in certain vehicle applications the user may want to have such a return force only when the vehicle is in reverse, but not in the forward direction, since the maintenance of the force needed to overcome the return force may be tiring to the user, or may be otherwise unnecessary. The cruise control feature preferably operates in the opposite direction so that, in this example, the cruise feature would be used when the vehicle is moving forward but not in reverse.

A better understanding of the objects, advantages, features, properties and relationships of the invention will be obtained from the following detailed description and accompanying drawings which set forth an illustrative embodiment and which are indicative of the various ways in which the principles of the invention may be employed.

DETAILED DESCRIPTION OF THE DRAWINGS

Turning now to the figures, wherein like reference numeral refer to like elements, there is illustrated an integrated hydrostatic transaxle 10 ("IHT"). An overview of the preferred invention can be most easily understood by reference to FIGS. 1, 2 and 5.

Figure 1:
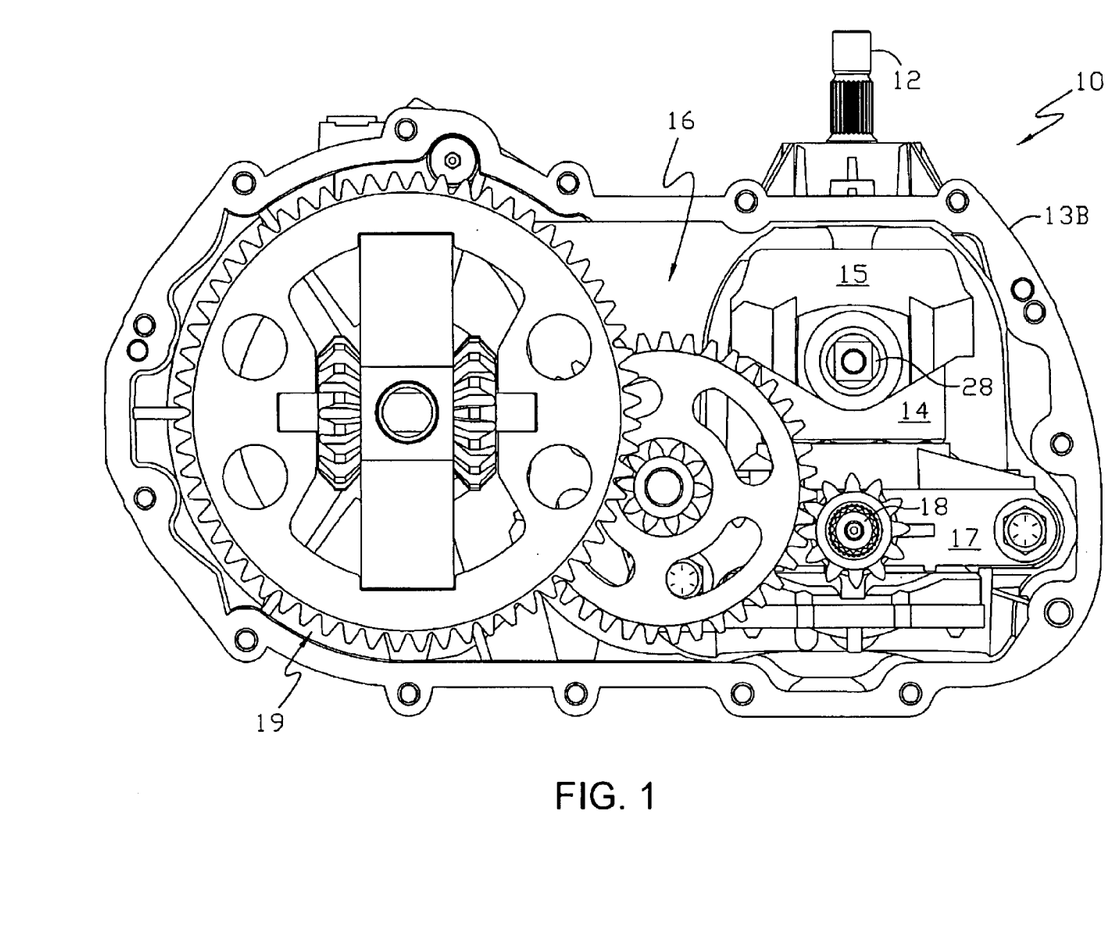
FIG. 1 is a side elevational view of an integrated hydrostatic transaxle, having a portion of the casing removed.

The operation of IHT 10 is well-understood, and reference is made to U.S. Pat. No. 6,253,637, where this IHT design is described in detail. In short, as shown in FIG. 1, input shaft 12 drives a hydraulic pump 14 mounted on a center section 17 and engaged to a hydraulic motor (not shown). The motor output shaft 18 is engaged to a gear train 16 which drives a differential gear assembly 19 to power one or more output axles 11. It will be understood that the invention described herein is not limited to use with this or any particular IHT design, but could be used with a wide variety of IHTs or with hydraulic pumps or HST designs. Other necessary or desirable elements of an IHT, such as brake mechanism 50 are not described in detail herein.

In the IHT depicted herein, the housing elements 13A and 13B are split vertically and are joined together by a plurality of bolts 35. In FIG. 1, only housing 13B is depicted, as element 13A is removed to show the internal structure of IHT 10. The control mechanism 40 is preferably located adjacent to housing element 13A.

IHT 10 includes moveable swash plate 15 against which the pump pistons (not shown) travel. As will be understood by those of ordinary skill in the art, swash plate 15 is supported by a pair of trunnions 27 and 28 and may be moved to a variety of positions to control the speed and direction of rotation of the hydraulic motor and, accordingly, the ultimate speed and direction of rotation of axle shaft 11. In this design, trunnions 27 and 28 are integrally formed with swash plate 15; it will be understood that other designs could be used within the spirit and scope of this invention, as long as it provides for similar rotation of swash plate 15.

Trunnions 27 and 28 are rotatably supported in housing elements 13A and 13B of the IHT 10. Rotation of trunnion 28 changes the angular orientation of swash plate 15 with respect to the pump pistons. A control mechanism 40 is coupled to trunnion 28 as described below. The control mechanism 40 may be connected, via a driving link, to a lever or a pedal provided on a vehicle whereby movement of the lever or pedal is translated to control mechanism 40 to cause the rotation of the trunnion arm 28 and movement of swash plate 15.

Figure 2:
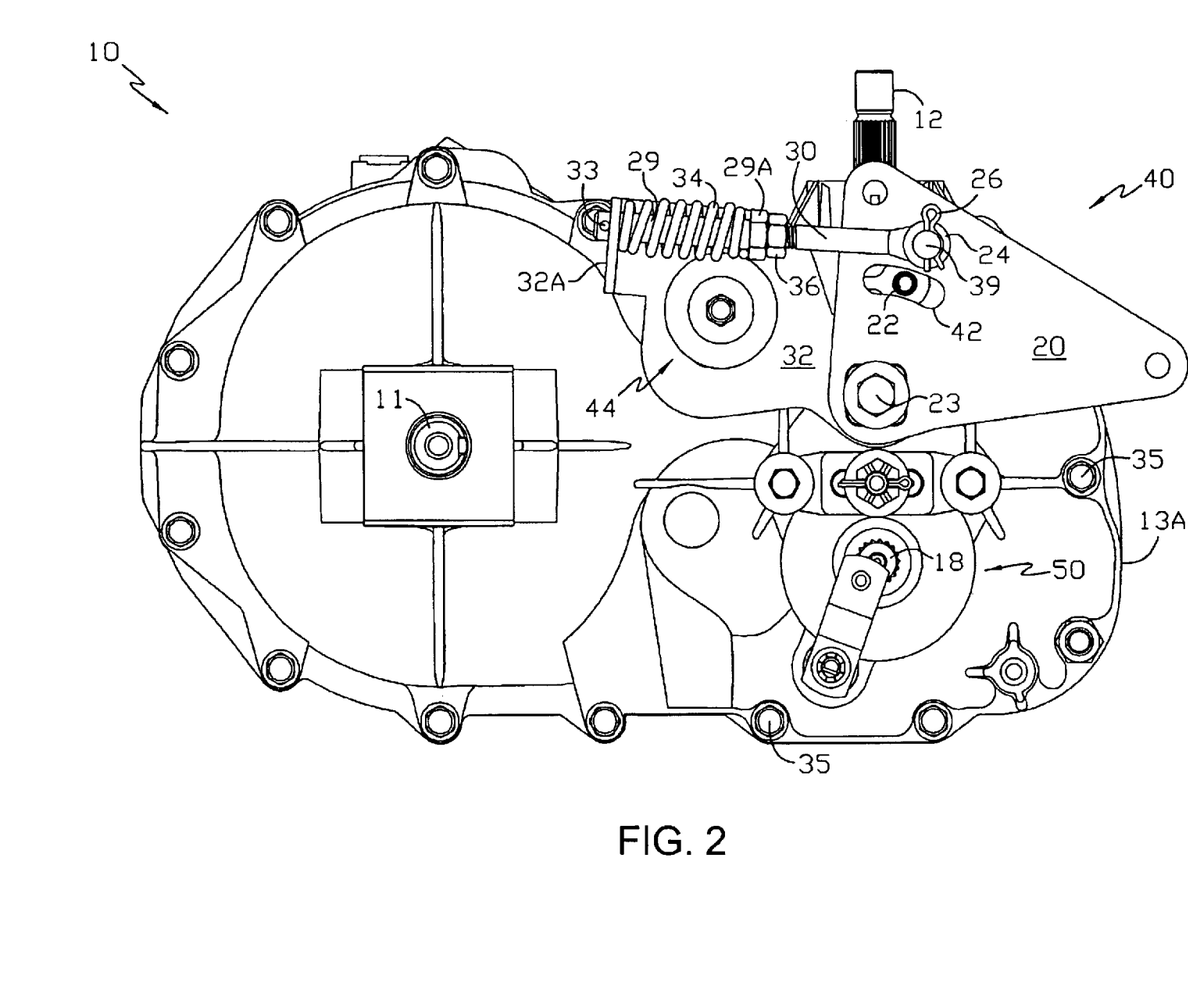
FIG. 2 is a side elevational view of a transaxle having a control mechanism in accordance with the present invention, where the control arm is in the neutral position.
Figure 5:
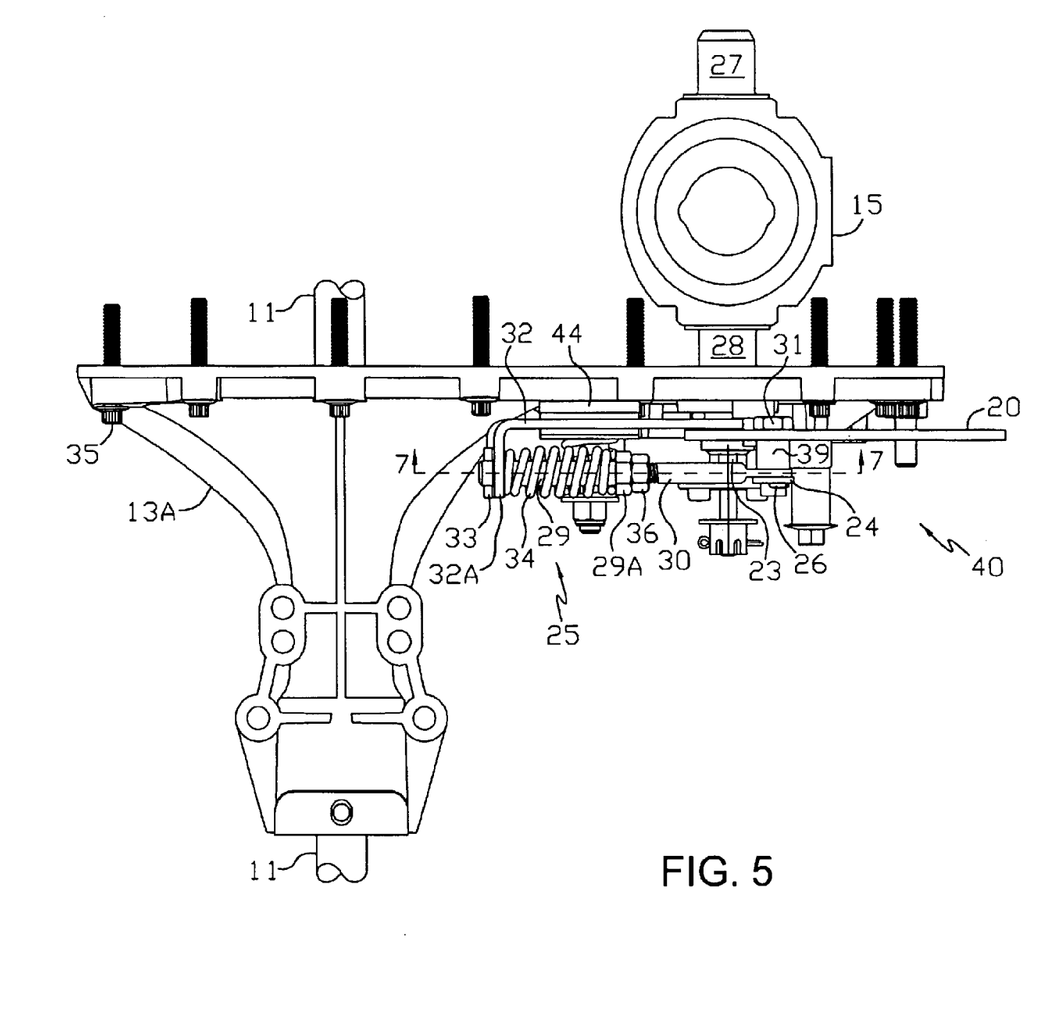
FIG. 5 is a top view of the control mechanism of FIG. 2.

Control mechanism 40 is comprised of control arm 20, cruise control arm 32 and attachment mechanism 25. Cruise control arm has flange 32A formed therewith and extending generally perpendicular to the body of arm 32. Attachment mechanism 25 is comprised of attachment linkage 30 threaded into adjustment linkage 29 and secured in place by nut 36, so that linkages 29 and 30 move together as a unit. In the embodiment shown, head 29A is integrally formed as part of linkage 29.

Attachment linkage 30 is connected to control arm 20 by means of cotter pin 26 and spacer 39, which is fixed to control arm 20 by bolt 31. A washer 24 is used to minimize component wear as control arm 20 is moved. Attachment linkage 30 is also engaged to cruise control arm 32 by way of adjustment linkage 29, which is held in place by means of pin 33; as can be seen by comparison of FIGS. 3 and 4, attachment mechanism 25 is slidable with respect to cruise control arm 32. Spring 34 is mounted on linkage 29 between head 29A and flange 32A. Thus, force from movement of attachment mechanism 25 is transferred to cruise control arm 32 through the interaction of either pin 33 or spring 34 acting on flange 32A, depending on the direction of the force.

Control arm 20 is engaged to trunnion 28 by bolt 23, so that rotation of control arm 20 provides a corresponding rotation of trunnion 28. Arcuate slot 42 is also formed into control arm 20. The range of motion of control arm 20 is governed by the interaction of arcuate slot 42 and pin 22; in FIG. 3, control arm 20 is in the full forward position while in FIG. 4 it is in the full reverse position and in FIG. 2, it is in the neutral position so that there would be little or no displacement of hydraulic fluid by pump 14.

A friction pack 44 is used in conjunction with cruise control arm 32 to maintain its position; friction pack 44 may include a plurality of friction disks such as is shown in U.S. Pat. No. 6,253,637. Other friction pack designs or apparatus for controlling movement of the cruise control arm could also be used within the scope and spirit of this invention.

Figure 4:
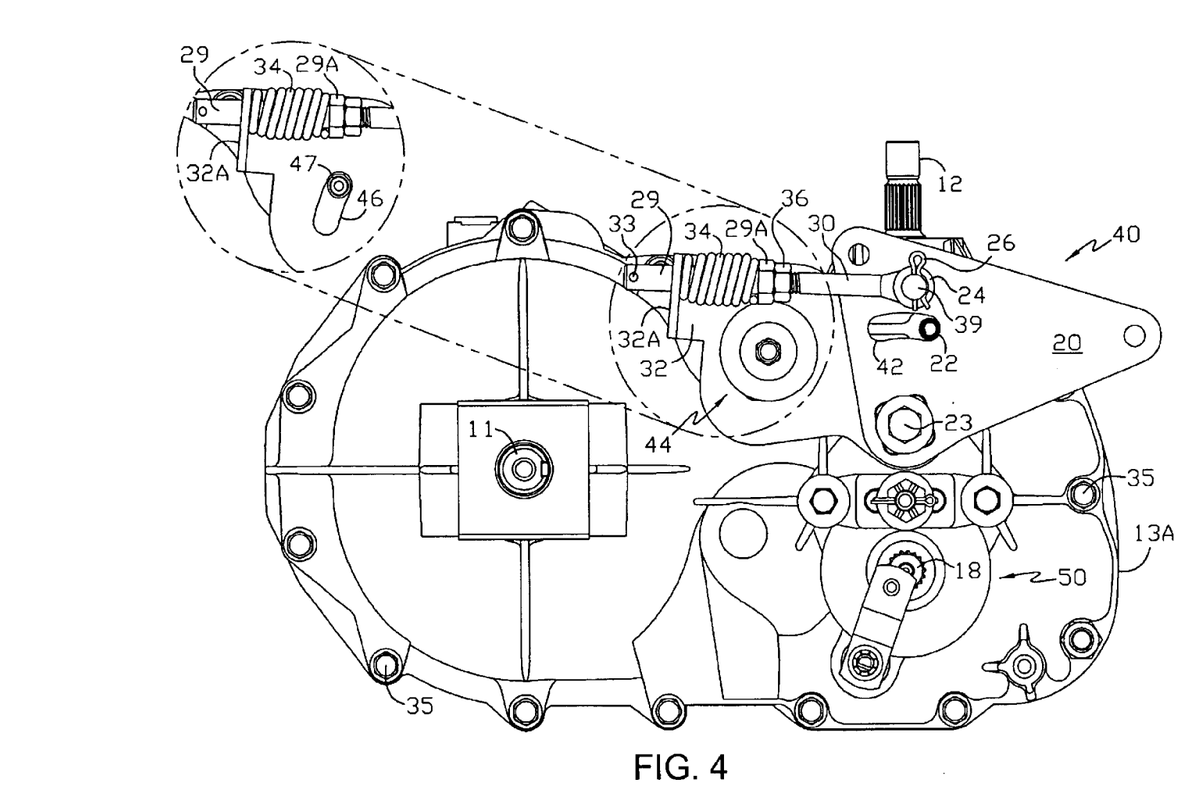
FIG. 4 is another side elevational view of the transaxle shown in FIG. 2, with the control arm in the reverse position, and including a detail view showing the cruise control arm with certain elements removed for clarity.
Figure 8:
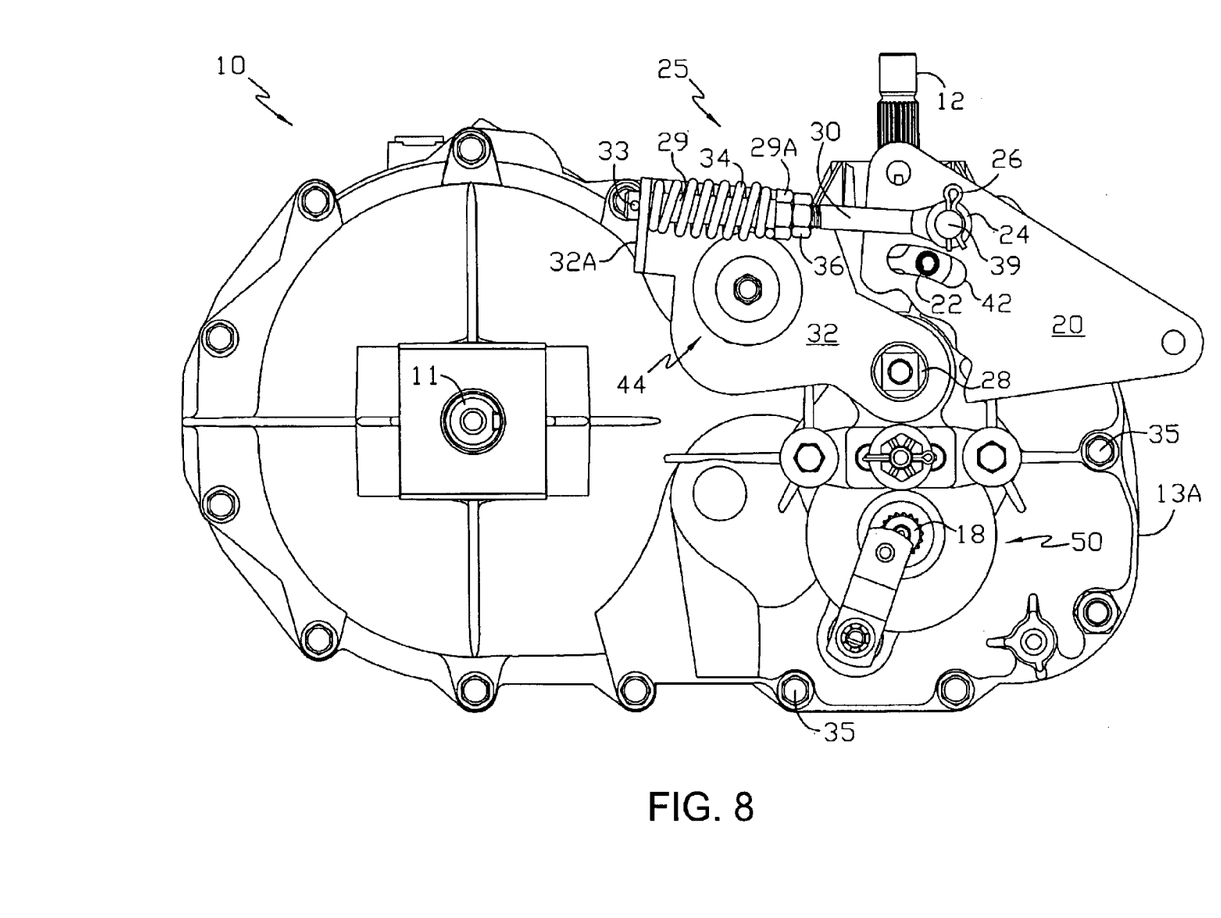
FIG. 8 is a side elevational view similar to that shown in FIG. 2, with a portion of the control arm removed for clarity.

As shown in FIGS. 4 and 8, cruise control arm 32 is mounted about trunnion arm 28 and also limited in its range of motion by arcuate slot 46 and pin 47 located behind friction pack 44. As will be understood from the following description, while both arms 20 and 32 rotate about the axis of trunnion arm 28, it is preferred that the range of motion of control arm 20 as dictated by arcuate slot 42 and pin 22 be greater than the range of motion of cruise control arm 32 as dictated by arcuate slot 46 and pin 47. In FIG. 8, a portion of control arm 20 has been cut away so that the mounting of cruise control arm 32 or trunnion 28 can be more readily seen.

Figure 3:
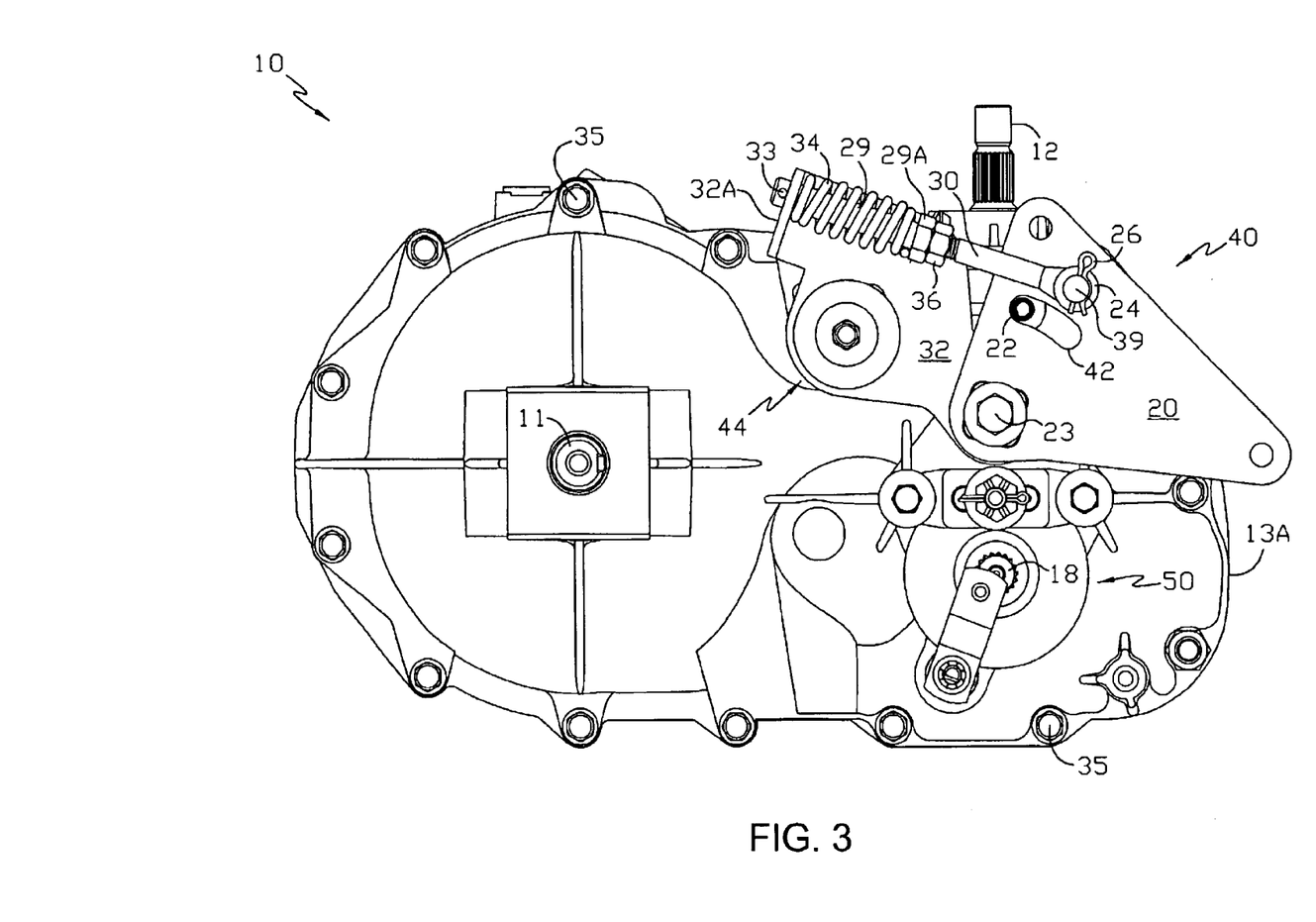
FIG. 3 is a side elevational view of the transaxle shown in FIG. 2, with the control arm in the engaged or forward position.

In FIG. 3, one can see that control arm 20 has been moved to the full forward position, and attachment linkage 30 acts to pull cruise control arm 32 forward with it. Friction pack 44 acts on cruise control arm 32 to retain it in the selected forward position. Specifically, the force of friction pack 44 or cruise control arm 32 will tend to retain arm 32 in the selected position until an adequate opposing force is applied. The operator will, therefore, need to move control arm 20 out of the forward engaged position in order to return the unit to neutral. The force required to compress or extend spring 34 is greater than the force needed to overcome the friction force of friction pack 44. Therefore, whenever the control arm is moved between the neutral position (FIG. 2) to and including the full forward position (FIG. 3), the attachment mechanism 25 moves as a solid piece; i.e., spring 34 is neither compressed or stretched.

In FIG. 4, the control arm 20 is pushed to its rearward position. As shown in the detail view, at one point in this motion, cruise control arm 32 is prevented from further rearward motion by means of arcuate slot 46 and pin 47. This point corresponds to the neutral position of trunnion 28 and swash plate 15. Thus, it will be understood that cruise control arm 32 may only move in the forward direction and not in the rearward direction. When this neutral point is reached, control arm 20 still has the ability to move in the rearward direction, so further motion thereof compresses spring 34 between head 29 and flange 32A. During this movement, trunnion arm 28 will rotate with respect to cruise control arm 32. Thus, as control arm 20 moves in the rearward direction, the force of spring 34 acts to counter such movement, acting as a return to neutral force to bring the unit out of reverse into neutral. For example, once an operator releases the lever or pedal connected to control arm 20, spring 34 will act to return the control arm 20 to the neutral position.

Figure 6:
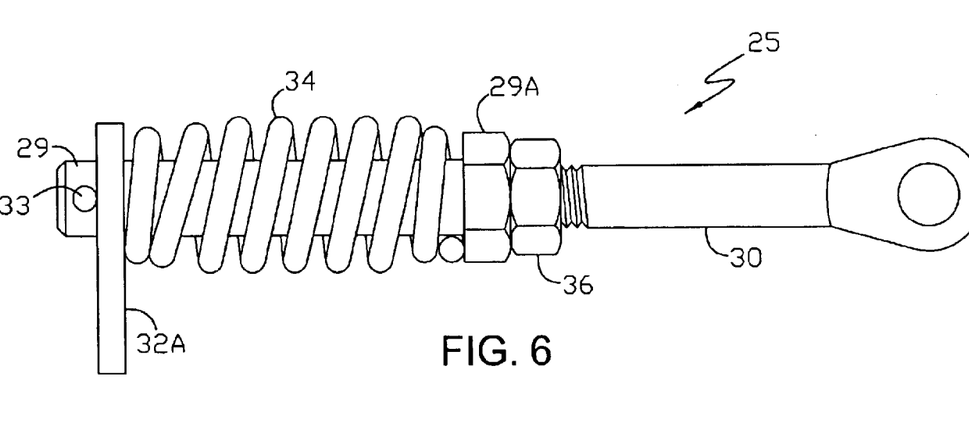
FIG. 6 is a plan view of the linkage mechanism of the present invention.
Figure 7:
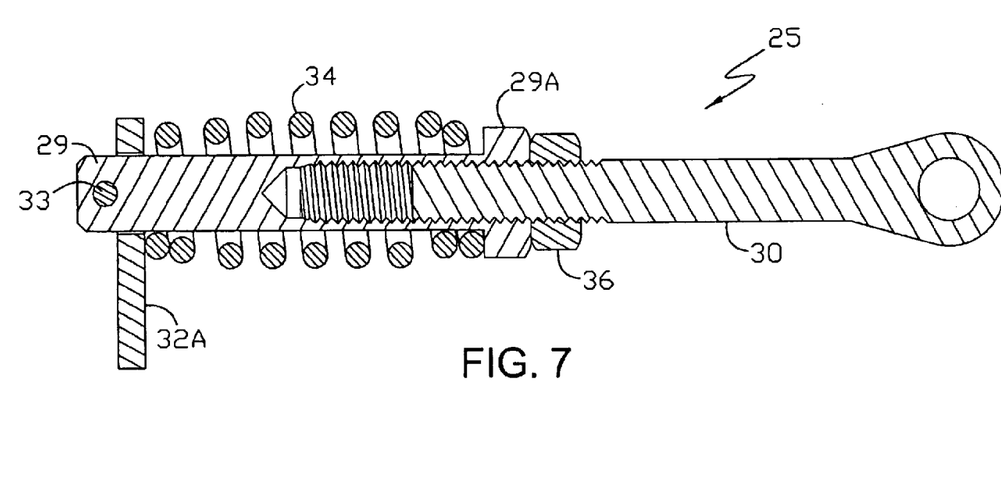
FIG. 7 is a cross sectional view of the linkage mechanism of FIG. 7, along the lines 7—7 in FIG. 6.

This invention also enables the party assembling the hydraulic device to easily set and adjust the neutral position. This adjustability can be seen most clearly in FIGS. 5, 6 and 7. During assembly, control arm 20 will initially be placed in the neutral position (as shown in FIG. 2). Cruise control arm 32 will then be moved to its neutral position (i.e., to the position shown in the detail in FIG. 4) independent of control arm 20.

When the control arm 20 and cruise control arm 32 are in the proper neutral location, adjustment linkage 29 is adjusted with respect to attachment linkage 30 to maintain arms 20 and 32 in the desired location. In the embodiment shown, linkage 29 is threaded on or off linkage 30 as needed to achieve the needed positioning, and nut 36 is tightened onto linkage head 29A to maintain this proper position.

While specific embodiments of the invention have been described in detail, it will be appreciated by those skilled in the art that various modifications and alternatives to those details could be developed in light of the overall teachings of the disclosure. Accordingly, the particular arrangements of the return to neutral mechanism, dampening mechanism, brake mechanism, etc. disclosed are meant to be illustrative only and not limiting as to the scope of the invention which is to be given the full breadth of the appended claims and any equivalents thereof.

What is claimed is:

1. A control apparatus for use with a hydraulic pump mounted in a housing and having a moveable swash plate which may be moved between forward, reverse and neutral positions, the control apparatus comprising:
   a rotatable shaft engaged to the swash plate in a manner so that rotation of the shaft causes a corresponding rotation of the swash plate, the shaft having a first end extending from the housing;
   a control arm engaged to the first end of the shaft, the control arm being movable between the forward, reverse and neutral positions;
   a cruise control arm mounted on and rotatable about the first end of the shaft;
   a linkage connecting the control arm to the cruise control arm;
   a stop associated with the anise control arm to prevent the cruise control arm from moving from the neutral position to a reverse position;
   a restraining device engaged to the cruise control arm to restrict movement thereof; and
   a spring device mounted on the linkage, where the spring device is compressed when the control arm is moved from the neutral position to a reverse position to provide a force compelling the control arm to return the shaft to the neutral position.

2. A control apparatus as set forth in claim 1, wherein the rotatable shaft is integrally formed with the swash plate.

3. A control apparatus as set forth in claim 1, wherein the restraining device comprises a friction pack.

4. A control apparatus as set fort in claim 3, wherein the force required to overcome the friction pack is less than the force required to compress the spring device during motion of the control apparatus in a forward position.

5. A control apparatus as set forth in claim 1, wherein the length of the linkage is adjustable.

6. A control apparatus as set forth in claim 1, wherein the linkage comprises a first member engaged to and slidable with respect to the cruise control arm and a second member engaged to the control arm where the second member is threaded into the first member.

7. A control apparatus as set forth in claim 6, wherein the spring is mounted on the first linkage member.

8. A control apparatus as set forth in claim 1, wherein the stop associated with the cruise control arm comprises a post fixed with respect to the housing and an arcuate slot formed in the cruise control arm.

9. A control apparatus as set forth in claim 1, wherein the range of motion of the control arm is limited by means of a post fixed with respect to the housing and an arcuate slot formed in the control arm.

10. A control apparatus as set forth in claim 1, wherein the rotatable shaft comprises a first trunnion arm integrally formed with the swash plate.

11. A control apparatus as set forth in claim 10, further comprising a second trunnion arm integrally formed with the swash plate, and wherein the swash plate is supported within the housing on the first and second trunnion arms.

12. A hydraulic drive apparatus comprising:
   a hydraulic pump mounted in a housing and having a swash plate moveable between a forward direction a reverse direction and a neutral position;
   a control arm engaged to the swash plate to move the swash plate between the forward and reverse directions and the neutral position;
   a cruise control device comprising a cruise control arm and a friction pack engaged thereto, wherein the cruise control device is movable between the neutral position and the forward direction only, the cruise control device connected to the control arm through a linkage to retain the control arm in a selected position, and the force required to overcome the friction pack is less than the force required to compress a spring during motion of the control arm in the forward direction; and
   a return mechanism engaged to the control arm to force the control arm to return to the neutral position from the reverse direction only.

13. A hydraulic drive apparatus as set forth in claim 12, further comprising a trunnion arm having a first end mounted to the swash plate and a second end extending out of the housing to engage the control arm.

14. A hydraulic drive apparatus as set forth in claim 13, further comprising a pump input shaft engaged to and driving the pump, wherein the pump input shaft is perpendicular to the trunnion arm.

15. A hydraulic drive apparatus as set forth in claim 12, wherein the return mechanism comprises a spring mounted on the linkage.

16. A hydraulic drive apparatus as set forth in claim 12, wherein the linkage comprises a first member engaged to and slidable with respect to the cruise control arm and a second member engaged to the control arm, where the second member is threaded into the first member so that the length of the linkage is adjustable.

17. A hydraulic drive apparatus comprising
   a hydraulic pump having a swash plate movable between forward, reverse and neutral positions;
   a control am engaged to the swash plate for moving the swash plate between the forward, reverse and neutral positions;
   a return to neutral means for forcing the control arm to the neutral position when it is in the reverse position;
   a cruise control means for retaining the control arm in a selected forward position, and where the cruise control means does not operate when the control arm is in the reverse position.

18. A control apparatus for use with a hydraulic pump mounted in a housing and having a moveable swash plate which may be moved between forward, reverse and neutral positions, the control apparatus comprising:
   rotation means engaged to the swash plate for rotating the swash plate between reverse, forward and a neutral positions;
   a rotatable control arm engaged to the rotation means;
   a rotatable cruise control arm secured to the control arm;
   means for linking the control arm with the cruise control arm;
   stop means for preventing the cruise control arm from moving from the neutral position to a reverse position;
   friction means engaged to the cruise control arm for frictionally restricting movement of the cruise control arm;
   spring means mounted on the means for linking for providing a force compelling the control apparatus to return the swash plate to the neutral position when the control arm is moved to a reverse position.

* * * * *

UNITED STATES PATENT AND TRADEMARK OFFICE
CERTIFICATE OF CORRECTION

PATENT NO. : 6,766,715 B1
DATED : July 27, 2004
INVENTOR(S) : Thomas D. Wiley and Herb Poplawski Page 1 of 1

It is certified that error appears in the above-identified patent and that said Letters Patent is hereby corrected as shown below:

<u>Title page,</u>
Item [57], ABSTRACT,
Line 8, delete "revere" and replace with -- reverse --.
Line 14, delete "am" and replace with -- arm --.

<u>Column 5,</u>
Line 20, delete "anise" and replace with -- cruise --.
Line 43, delete "arm where" and replace with -- arm, where --.

<u>Column 6,</u>
Line 33, delete "am" and replace with -- arm --.

Signed and Sealed this

Twenty-first Day of December, 2004

JON W. DUDAS
*Director of the United States Patent and Trademark Office*